United States Patent
Yedla et al.

(10) Patent No.: US 10,380,741 B2
(45) Date of Patent: Aug. 13, 2019

(54) SYSTEM AND METHOD FOR A DEEP LEARNING MACHINE FOR OBJECT DETECTION

(71) Applicant: Samsung Electronics Co., Ltd., Gyeonggi-do (KR)

(72) Inventors: Arvind Yedla, La Jolla, CA (US); Marcel Nassar, San Diego, CA (US); Mostafa El-Khamy, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 155 days.

(21) Appl. No.: 15/478,947

(22) Filed: Apr. 4, 2017

(65) Prior Publication Data

US 2018/0158189 A1 Jun. 7, 2018

Related U.S. Application Data (60) Provisional application No. 62/431,086, filed on Dec. 7, 2016.

(51) Int. Cl.
| | | |
|---|---|---|
| *G06T 7/11* | (2017.01) | |
| *G06T 7/194* | (2017.01) | |
| *G06N 3/04* | (2006.01) | |
| *G06K 9/00* | (2006.01) | |
| *G06K 9/32* | (2006.01) | |

(Continued)

(52) U.S. Cl.
CPC ............ *G06T 7/11* (2017.01); *G06K 9/00369* (2013.01); *G06K 9/3241* (2013.01); *G06K 9/4628* (2013.01); *G06K 9/627* (2013.01); *G06N 3/0454* (2013.01); *G06T 7/194* (2017.01)

(58) Field of Classification Search
CPC .. G06T 2207/20084; G06T 7/11; G06T 7/194
See application file for complete search history.

(56) References Cited

U.S. PATENT DOCUMENTS

| | | |
|---|---|---|
| 9,058,541 B2 | 6/2015 | Dubout et al. |
| 9,424,493 B2 | 8/2016 | He et al. |

(Continued)

FOREIGN PATENT DOCUMENTS

WO      WO 2016/170333      10/2016

OTHER PUBLICATIONS

Chen, Liang-Chieh et al. Semantic Image Segmentation with Deep Convolutional Nets and Fully Connected CRFs, ICLR 2015, 14 pages.

(Continued)

*Primary Examiner* — Manuchehr Rahmjoo
(74) *Attorney, Agent, or Firm* — The Farrell Law Firm, P.C.

(57) ABSTRACT

Apparatuses and methods of manufacturing same, systems, and methods for object detection using a region-based deep learning model are described. In one aspect, a method is provided, in which a region proposal network (RPN) is used to identify regions of interest (RoI) in an image by assigning a confidence levels, the assigned confidence levels of the RoIs are used to boost the background score assigned by the downstream classifier to each RoI, and the background scores are used in a softmax function to calculate the final class probabilities for each object class.

18 Claims, 5 Drawing Sheets

(51) Int. Cl.
*G06K 9/46* (2006.01)
*G06K 9/62* (2006.01)

(56) References Cited

U.S. PATENT DOCUMENTS

| | | |
|---|---|---|
| 9,471,840 B2 | 10/2016 | Govil et al. |
| 9,858,496 B2 * | 1/2018 | Sun ......................... G06N 3/084 |
| 2017/0344808 A1 * | 11/2017 | El-Khamy ................ G06T 7/70 |

OTHER PUBLICATIONS

He, Kaiming et al., Deep Residual Learning for Image Recognition, Dec. 2015, 12 pages.
Cai, Zhaowei et al., A Unified Multi-Scale Deep Convolutional Neural Network for Fast Object Detection, Jul. 2016, 16 pages.
Farfade, Sachin Sudhakar et al., Multi-View Face Detection Using Deep Convolutional Neural Networks, ICMR 2015, Jun. 23-26, 2015, Shanghai, China, 8 pages.
Dai, Jifeng et al., R-FCN: Object Detection via Region-based Fully Convolutional Networks, 30th Conference on Neural Information Processing Systems (NIPS 2016) Barcelona, Spain, 9 pages.
Dollar, Piotr et al., Fast Feature Pyramids for Object Detection, IEEE Transactions on Pattern Analysis and Machine Intelligence, vol. 36, No. 8, Aug. 2014, pp. 1532-1545.
Dollar, Piotr et al., Pedestrian Detection: A Benchmark, IEEE 2009, pp. 304-311.
Dollar, Piotr et al., Pedestrian Detection: An Evaluation of the State of the Art, IEEE Transactions on Pattern Analysis and Machine Intelligence, vol. 34, No. 4, Apr. 2012, pp. 743-761.
Gidaris, Spyros et al., Object detection via a multi-region & semantic segmentation-aware CNN model, 2015 IEEE International Conference on Computer Vision, pp. 1134-1142.
Girshick, Ross, Fast R-CNN, 2015 IEEE International Conference on Computer Vision, pp. 1440-1448.
Li, Jianan et al., Scale-aware fast R-CNN for Pedestrian Detection, Jun. 2016, 10 pages.
Lin, Tsung-Yi et al., Microsoft COCO: Common Objects in Context, Feb. 2015, 15 pages.
Parkhi, Omkar m. et al., Deep Face Recognition, 2015, 12 pages.
Ren, Shaoqing et al., Faster R-CNN: Towards Real-Time Obect Detection with Region Proposal Networks, Neural Information Processing Systems, Jan. 2016, 14 pages.
Zhang, Liliang et al., Is Faster R-CNN Doing Well for Pedestrian Detection?, 15 pages.
Shrivastava, Abhinav et al., Training Region-based Object Detectors with Online Hard Example Mining, 2016 IEEE Conference on Computer Vision and Pattern Recognition, pp. 761-769.
Mallat, Stephane, A Wavelet Tour of Signal Processing, 109 pages.
Shensa, Mark J. et al., The Discrete Wavelet Transform: Wedding the A Trous and Mallat Algorithms, IEEE Transactions on Signal Processing, vol. 40, No. 10, Oct. 1992, pp. 2464-2482.
Lecun, Yann et al., Deep Learning, Nature, vol. 521, May 28, 2015, pp. 436-444.

\* cited by examiner

SYSTEM AND METHOD FOR A DEEP LEARNING MACHINE FOR OBJECT DETECTION

PRIORITY

This application claims priority under 35 U.S.C. § 119(e) to U.S. Provisional Patent Application Ser. No. 62/431,086 filed in the United States Patent and Trademark Office on Dec. 7, 2016, the entire contents of which are incorporated herein by reference.

FIELD

The present disclosure relates generally to machine learning, and more particularly, to a system and method for a deep learning machine for object detection.

BACKGROUND

Machine learning technology is continually evolving and has come to support many aspects of modern society, from web searches, content filtering, automated recommendations on merchant websites, automated game playing, to object detection, image classification, speech recognition, machine translations, and drug discovery and genomics. The current state of the art in the field of machine learning are deep neural networks, which use computational models composed of multiple processing layers which learn representations of data (usually, extremely large amounts of data) with multiple levels of abstraction—hence, the terminology "deep learning", "deep networks," etc. See, e.g., LeCun, Yann, Yoshua Bengio, and Geoffrey Hinton. "Deep learning." Nature, vol. 521, pp. 436-444 (28 May 2015), which is hereby incorporated herein by reference in its entirety.

Deep learning approaches have shown excellent performance for general object detection. However, the detection of certain objects and/or certain situations have been more difficult, even using deep learning. Pedestrian detection, which has many real-world applications, such as autonomous driving and advanced driving assistance systems, is one area where detection via deep learning has had somewhat limited results.

SUMMARY

According to an aspect of the present disclosure, a method of object detection using a region-based deep learning model is provided, including using a region proposal network (RPN) to identify regions of interest (RoI) in an image by assigning a confidence levels; using the assigned confidence levels of the RoIs to boost the background score assigned by the downstream classifier to each RoI; and using the scores in a softmax function to calculate final class probabilities for each object class.

According to an aspect of the present disclosure, an apparatus capable of object detection using a region-based deep learning model is provided, including one or more non-transitory computer-readable media; and at least one processor which, when executing instructions stored on one or more non-transitory computer readable media, performs the steps of using a region proposal network (RPN) to identify regions of interest (RoI) in an image by assigning confidence levels, using the assigned confidence levels of the RoIs to boost the background score assigned by the downstream classifier to each RoI, and using the scores in a softmax function to calculate final class probabilities for each object class.

According to an aspect of the present disclosure, a method is provided, including manufacturing a chipset including at least one processor which, when executing instructions stored on one or more non-transitory computer readable media, performs the steps of: using a region proposal network (RPN) to identify regions of interest (RoI) in an image by assigning a confidence levels; using the assigned confidence levels of the RoIs to boost the background score assigned by the downstream classifier to each RoI; and using the scores in a softmax function to calculate final class probabilities for each object class; and the one or more non-transitory computer-readable media which store the instructions.

According to an aspect of the present disclosure, a method is provided for testing an apparatus, including testing whether the apparatus has at least one processor which, when executing instructions stored on one or more non-transitory computer readable media, performs the steps of: using a region proposal network (RPN) to identify regions of interest (RoI) in an image by assigning confidence levels; using the assigned confidence levels of the RoIs to boost the background score assigned by the downstream classifier to each RoI; and using the scores in a softmax function to calculate final class probabilities for each object class; and testing whether the apparatus has the one or more non-transitory computer-readable media which store the instructions.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements are designated by the same reference numerals although they are shown in different drawings. In the following description, specific details such as detailed configurations and components are merely provided to assist in the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or custom. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although terms including an ordinal number such as first and second may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

Various embodiments may include one or more elements. An element may include any structure arranged to perform certain operations. Although an embodiment may be described with a limited number of elements in a certain arrangement by way of example, the embodiment may include more or less elements in alternate arrangements as desired for a given implementation. It is worthy to note that any reference to "one embodiment" or "an embodiment" means that a particular feature, structure, or characteristic described in connection with the embodiment is included in at least one embodiment. The appearance of the phrase "one embodiment" (or "an embodiment") in various places in this specification does not necessarily refer to the same embodiment.

As stated above, although deep learning approaches have shown excellent performance for general object detection, their performance on pedestrian detection has been limited.

Faster region-based convolutional neural networks (R-CNN) have been the de facto framework for general object detection. However, this framework suffers from a high false positive rate, i.e., background regions are detected as objects belonging to the set of pre-determined (foreground) object categories, like persons. Accordingly, faster R-CNN has had limited results regarding pedestrian detection.

Embodiments of the present disclosure reduce the false positive rate by using the region proposal network (RPN) score to boost the background score (or confidence level) of image regions (i.e., regions of interest (RoI)) used by the downstream classifier of faster R-CNN. In simple terms, if the RPN is highly confident that a RoI is background, then the confidence of the downstream classifier for the background class is boosted proportionally, thereby reducing false positive foregrounds/objects. The technique described herein is general, and can also be used for inference estimates on models trained without RPN. In addition, other sources of information, like semantic segmentation masks, can also be used to boost the background scores of the RoIs in the downstream classifier.

The faster R-CNN framework, such as described by Ren, S., He, K., Girshick, R. and Sun, J., *Faster R-CNN: Towards real-time object detection with region proposal networks*, in ADVANCES IN NEURAL INFORMATION PROCESSING SYSTEMS, pp. 91-99 (2015), which is incorporated herein by reference in its entirety, has been one of the most successful general object detection techniques so far. It is a fully neural network approach, with a two-stage detection process.

Figure 1:
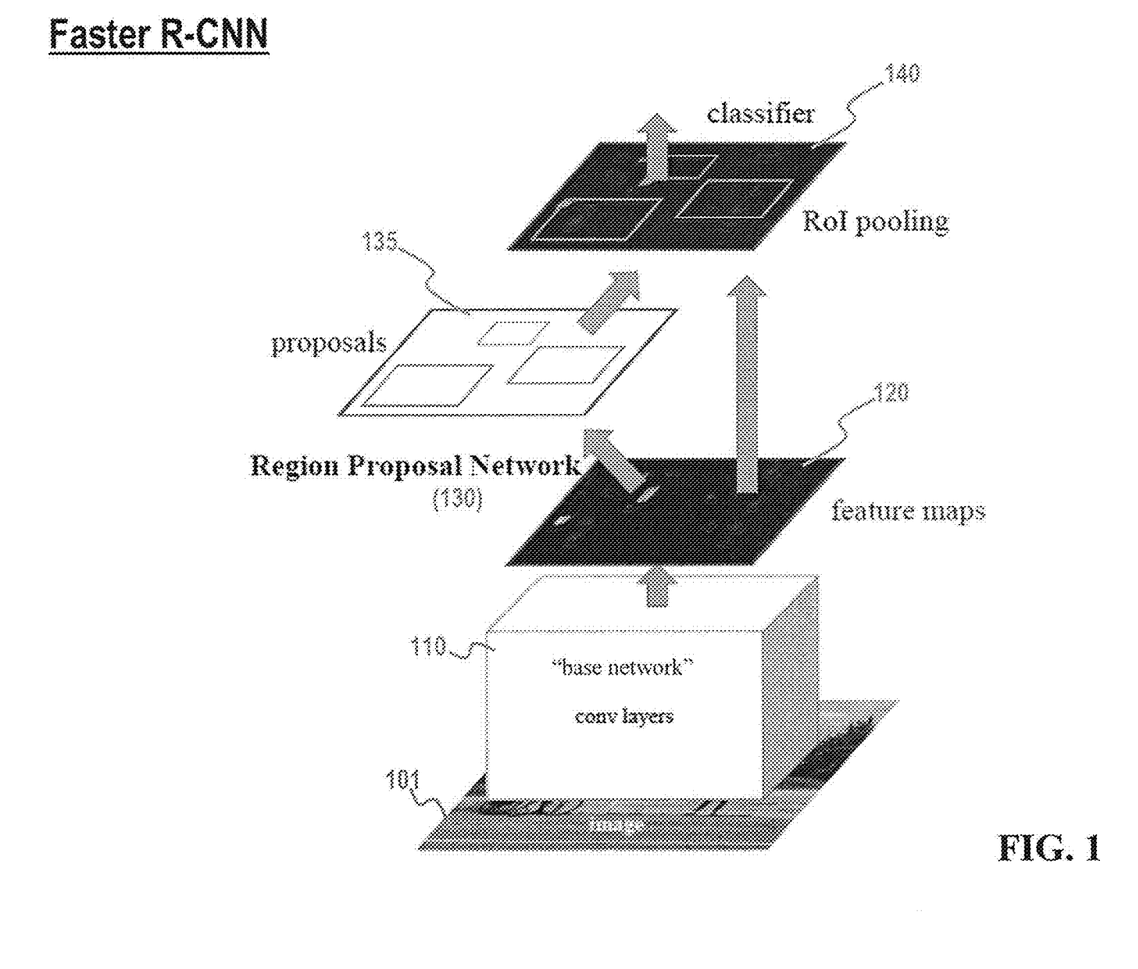
FIG. 1 is a block diagram illustrating a Faster Region-based Convolutional Neural Network (R-CNN) according to an embodiment of the present disclosure.

FIG. 1 is a block diagram illustrating a faster R-CNN according to which embodiments of the present disclosure can be applied. As shown in FIG. 1, an input image 101 is processed by a deep CNN, which will be called the base network 110 in this disclosure, resulting in a feature maps 120.

The first stage is a sliding window based detector, the RPN 130. The RPN is used to predict the objectness scores, which measures the probability of membership to a set of object classes (in the foreground) vs. the background (with no objects), of anchors corresponding to each of the locations in the input image. "Objectness" can be broadly considered as a measure of whether there is an object in a portion of an image. Overlapping proposals 135 are generated through the RPN 130.

In the second stage, the regions proposed by the RPN are fed into a downstream classifier 140 for further classification into one of several object categories. This is done using an attention mechanism called RoI pooling.

The main drawback of the faster R-CNN approach is that the downstream classification needs to be performed independently for each RoI. A new type of network, the region-based fully convolutional network (R-FCN), such as is described in Dai, J., Li, Y., He, K. and Sun, J., *R-FCN: Object Detection via Region-based Fully Convolutional Networks*, arXiv preprint arXiv:1605.06409 (2016), which is incorporated by reference herein in its entirety, was developed to address the inefficiencies in the faster R-CNN framework by sharing computation across the different RoIs.

Figure 2:
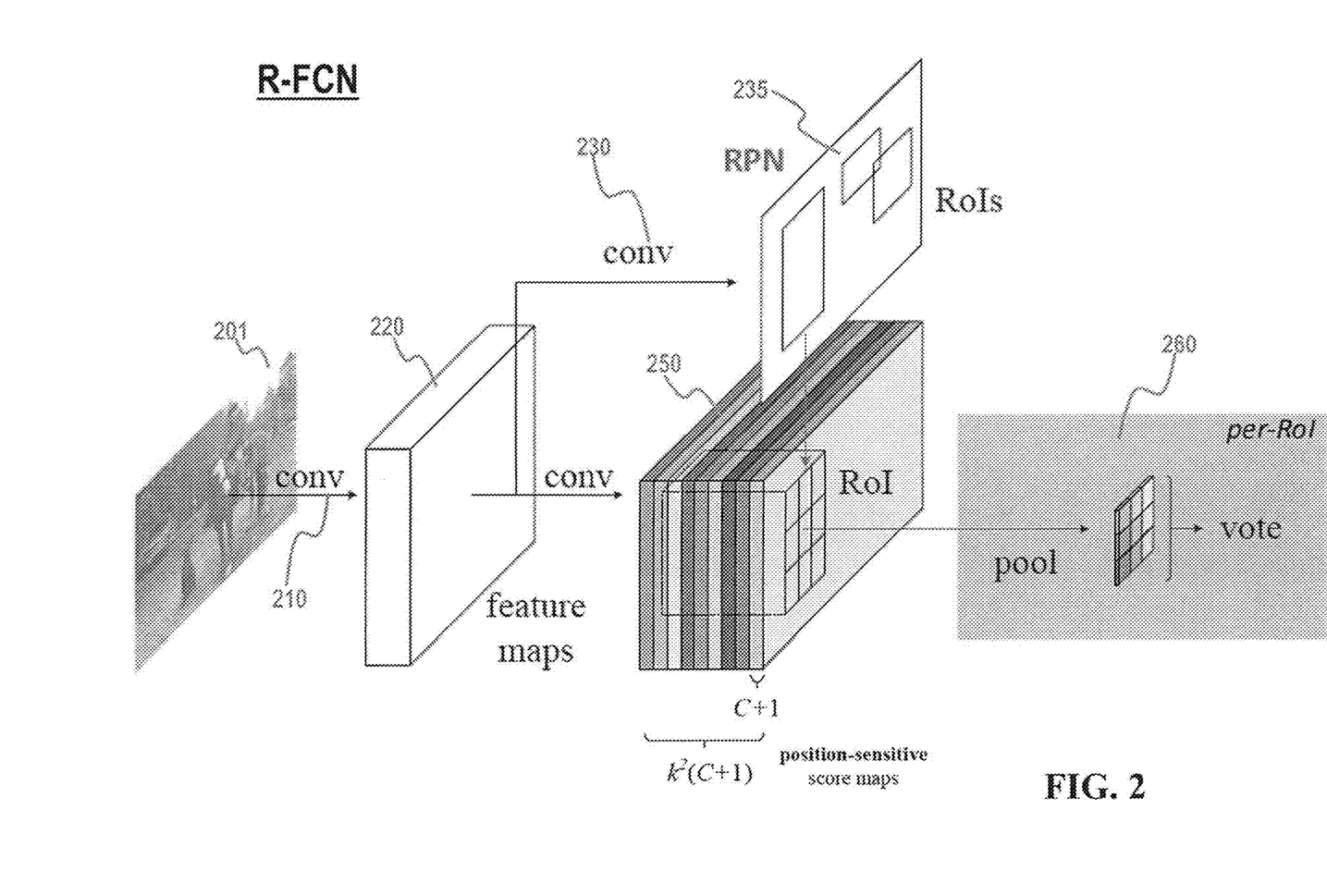
FIG. 2 is a block diagram illustrating a Region-based Fully Convolutional Network (R-FCN) according to an embodiment of the present disclosure.

FIG. 2 illustrates an R-FCN according to which embodiments of the present disclosure can be applied. Like FIG. 1, in FIG. 2, image 201 is processed by the base network 210 to generate feature maps 220.

The R-FCN architecture is designed to classify the proposed RoIs into object categories and background. However, in the R-FCN framework, the downstream classifier is implemented using a convolution-only network. Because convolutional networks are translation invariant, and object detection needs to be sensitive to translations in object position, the R-FCN framework generates a bank of specialized convolutional layers, known as position-sensitive score maps 250, in which each score map encodes position information relative to a relative spatial position as a channel dimension.

More specifically, as shown in FIG. 2, there is a bank of k² position-sensitive score maps for each category/class, resulting in k²(C+1)-channel output layer with C object categories/classes (and +1 for background). The bank of k² score maps correspond to a k×k spatial grid describing relative positions. For example, with k×k=3×3, the 9 score maps encode the cases of {top-left, top-center, top-right, . . . , bottom-right} of an object category.

This is followed by a position-sensitive RoI (PS-RoI) pooling layer that gathers information from these maps and generates scores for each RoI—i.e., per—ROI 260 in FIG. 2. The pooling is selective, with each with k×k bin aggregating responses from only one score map out of the bank of with k×k score maps.

By contrast, embodiments of the present disclosure provide a mechanism to reduce the false positive rate (or "false object rate") of region-based deep learning systems for object detection. The baseline faster R-CNN/R-FCN models use the RPN scores only for sorting the RoIs and selecting the top-N RoIs for downstream classification. A drawback of this approach is that all the top-N RoIs are treated equally by the downstream classifier. This might include RoIs which have a very low objectness score.

In embodiments according to the present disclosure, the region scores generated by the RPN are used to boost the scores computed by the downstream classifier. This technique is called RPN boosting. In one embodiment, a Bayesian framework could be used to compute the a posteriori probability of a RoI being an object given both the RPN and classifier scores. However, this approach biases the scores of all objects towards the background and lowers the scores of the good RoIs (i.e., those RoIs more likely to be an object).

For example, let $C_0, C_1, \ldots, C_K$ denote the K+1 classes of interest, with $C_0$ denoting the background class. For a given RoI, let $P_B$, $P_F$ be the background and foreground probabilities assigned by the RPN to that RoI. The foreground probability includes the probability that an object exists, where such object can belong to any such of K classes of interest. Also, let $s_0, s_1, \ldots, s_K$ be the scores assigned to that RoI by the downstream classifier. The background score is then boosted according to the RPN confidence represented by Equation (1):

$$s_0 = \begin{cases} s_0 & \text{if } P_B < P_F \\ \dfrac{P_B \cdot s_0}{P_F} & \text{otherwise} \end{cases} \quad (1)$$

The updated scores are used to compute the final class probabilities using the softmax layer, which outputs the probability distribution over the possible classes.

Specifically, continuing with the example above, with K+1 classes and updated boosted scores $s=\{s_0, s_1, \ldots, s_K\}$, where $s_0$ is boosted according to Equation (1), then the probability $y_m$ of a class C having label m (i.e., $C_m$) is calculated by the softmax layer using Equation (2):

$$y_m = P(C = C_m \mid s) = \dfrac{e^{s_m}}{\sum_{i=0}^{K} e^{s_i}} \quad (2)$$

The softmax probability can be used directly in prediction phase, wherein a boosting of $s_0$ affects the probability of all other classes as it changes the denominator in right hand side of Equation (2).

While using the softmax probability in the training phase, it is more convenient to express the softmax probability as a cross entropy function E in the log domain as given by Equation (3) below, wherein $t_i=1$ if the training input corresponds to class $C_m$ (i.e., $t_i=t_m=1$), and zero otherwise (i.e., $t_i=0$), and θ are the network parameters.

$$\varepsilon = -\log L(\theta \mid t, s) = -\sum_{i=0}^{K} t_i * \log(y_i) \quad (3)$$

To maximize the parameters θ of the network, the partial derivative of the cross entropy function ε with respect to the score $s_m$ is used, as shown in Equation (4):

$$\dfrac{\partial \varepsilon}{\partial s_m} = y_m - t_m \quad (4)$$

Figure 3:
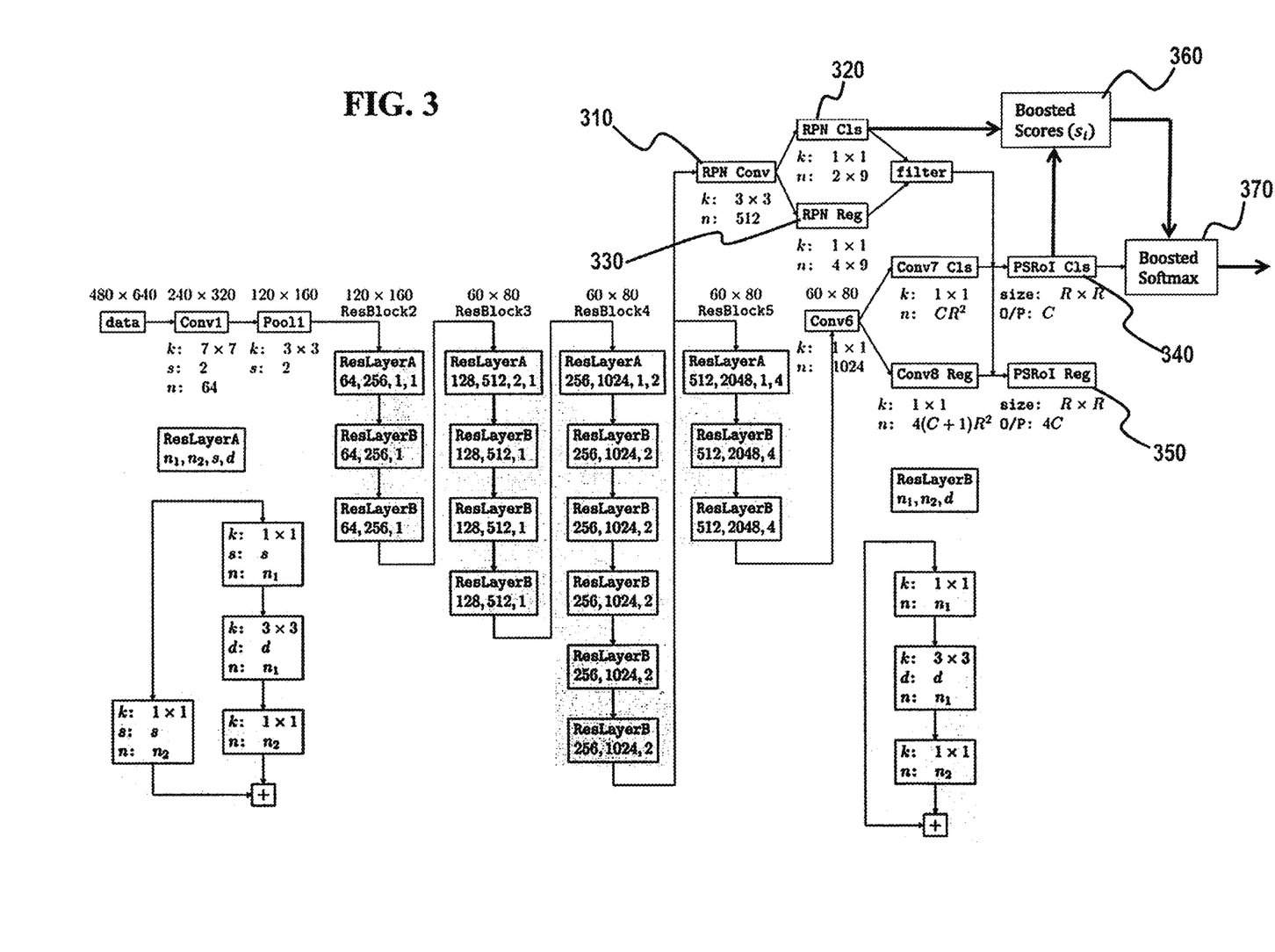
FIG. 3 is a block diagram illustrating the construction of a network according to an embodiment of the present disclosure.

FIG. 3 is a block diagram illustrating an example of a deep neural convolutional network to which an embodiment of the present disclosure is applied. The blocks and layers at the bottom form a residual network (ResNet). The output of the ResNet is fed into a regional proposal convolutional network (RPN Conv) 310 whose output is used by the regional proposal classification function (RPN_Cls) 320 to obtain classification scores for objectness and by the RPN box regression (RPN Reg) 330 to produce coordinates for the detection boxes of an object. For further classification of the detection object, this information is used by the Position Sensitive Region of Interest Classification (PSRoI Cls) 340 and Regression (PSRoI Reg) 350 networks to produce classification scores for each possible class category and refine the detection boxes for each possible object detection delivered by the RPN to the ROI network. The operations of Boosted Scores ($s_i$) 360 and Boosted Softmax 370 relate to Equations (1) and (2), respectively, described above.

Figure 4:
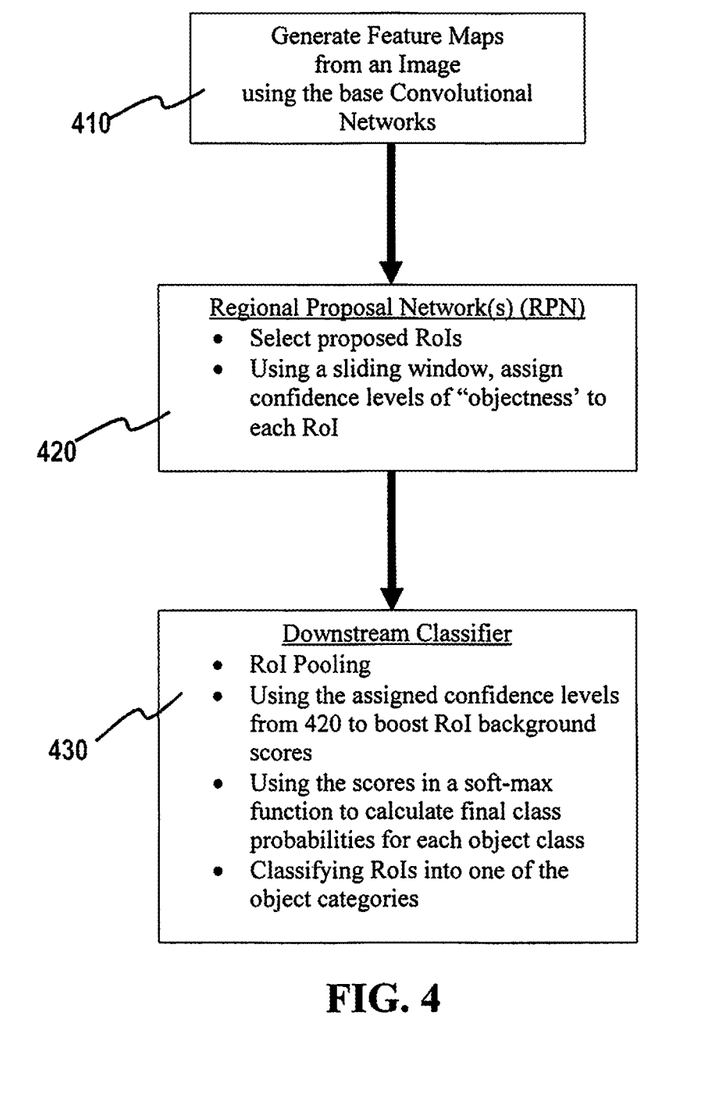
FIG. 4 is a flowchart of a method according to an embodiment of the present disclosure.

FIG. 4 is a flowchart of a method according to an embodiment of the present disclosure. In 410, the input image is processed by the base network in order to generate feature maps. In 420, the RPN sliding window based detector selects proposed RoIs and assigns confidence levels to each RoI of objectness scores—i.e., the probabilities of a RoI being an object in the foreground or just part of the background. In 430, the regions proposed by the RPN are pooled by the downstream classifier which further classifies each RoI into one of several object categories. However, 430 also uses the confidence levels calculated by the RPN in 420 to boost the background scores of the RoIs before the downstream classifier classifies the RoIs. The background score are also used in a softmax function to calculate final class probabilities for each object class.

In another embodiment of the present disclosure, semantic segmentation masks, which may be obtained from any other source, are used for RPN boosting, thereby reducing the false alarm rate of the detector. A semantic segmentation mask is delivered by another semantic segmentation algorithm and provides pixel wise labeling for each class under consideration in contrast to region or box-wise labeling by an object detection network. For each RoI in such an embodiment, the foreground and background probabilities $P_F$ and $P_B$ can be calculated from the ratio of foreground pixels to the total number of pixels in the RoI. If required, a lower limit can be set on the number of foreground pixels in an RoI, in order to prevent $P_F$ from dropping to 0. This prevents the classifier from assigning a background probability of 1.

In yet another embodiment of the present disclosure, the magnitude of the optical flow is used for RPN boosting to thereby reduce the false alarm rate of the detector. The optical flow may be obtained from any other source. Optical Flow information is provided by another algorithm as a measure of the degree of change in pixel values from one frame to another and can be used as indication of a moving object if the camera is stationary, such as in surveillance cameras. In such an embodiment, a threshold τ is set for the magnitude of the optical flow. Assuming that the background does not move, a pixel can be classified as background if the magnitude of optical flow is less than the threshold τ, otherwise the pixel is set as foreground. For each RoI, the foreground and background probabilities $P_F$ and $P_B$ can be calculated from the ratios of foreground pixels to the total number of pixels in the RoI. If required, a lower limit can be set on the number of foreground pixels in an RoI in order to prevent $P_F$ from dropping to 0.

In still another embodiment, the RPN scaling can be combined along with other scale factors, such as those determined either by semantic segmentation or optical flow, to calculate the boosting.

In yet still another embodiment, iterative refinement can be used on the boosted RPN, i.e., as the classification head modifies the classification scores and readjusts the region, the ROI score of the updated ROI region is reused in the next iteration. In an iterative scheme, only the detection candidates at the current iteration which have the top classification scores are reconsidered.

For example, let $D_0 = \{(s_i, B_i)\}_{i=1}^{N}$, be the set of detections that are output by the network. Here $s_i$ and $B_i$ denote the score and bounding box coordinates of the ith predicted box. When the input of the RoI pooling layer is replaced with $\{B_i\}$ and the network run forward from the RoI pooling layer, a new set of detections $D_1 = \{(s'_i, B'_i)\}_{i=1}^{N}$ corresponding to the new RoIs is obtained. Let $D = D_0 \cup D_1$ and let N=NMS(D, τ), where NMS refers to the Non-Maximum Suppression algorithm which suppresses detections that do not have the maximum score. The final output can be further refined by taking the average of the overlapping detection boxes in the first iteration and those in the second iteration using AVG(N,D).

Figure 5:
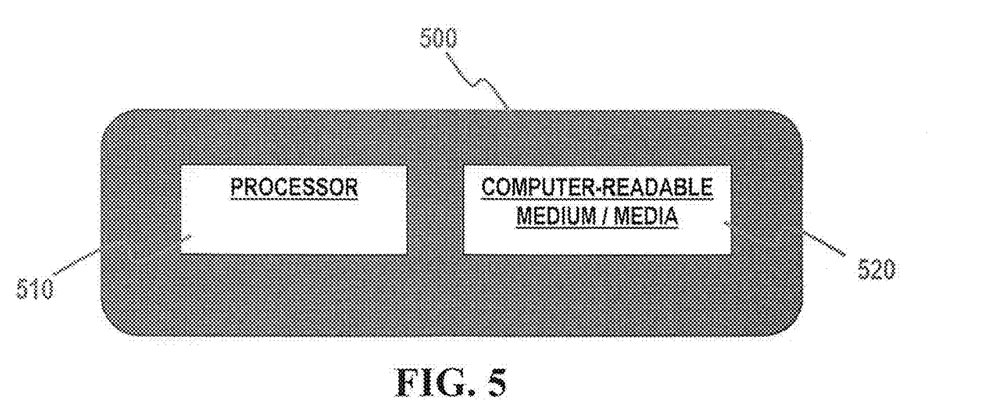
FIG. 5 is a block diagram illustrating an example of a deep neural convolutional network to which an embodiment of the present disclosure is applied.

FIG. 5 illustrates an exemplary diagram of the present apparatus, according to one embodiment. An apparatus 500 includes at least one processor 510 and one or more non-transitory computer readable media 520. The at least one processor 510, when executing instructions stored on the one or more non-transitory computer readable media 520, performs the steps of using an RPN to identify RoIs in an image by assigning a confidence levels; using the assigned confidence levels of the RoIs to boost the background score assigned by the downstream classifier to each RoI; and using the scores in a softmax function to calculate final class probabilities for each object class. Moreover, the one or more non-transitory computer-readable media 520 stores instructions for the at least one processor 510 to perform the above-listed steps.

In another embodiment, the at least one processor 510, when executing instructions stored on the one or more non-transitory computer readable media 520, uses at least one of confidence levels assigned by an RPN to identify RoIs in an image, semantic segmentation masks, and the magnitude of optical flow to boost background scores used by the downstream classifier. Moreover, the one or more non-transitory computer-readable media 520 stores instructions for the at least one processor 510 to perform these steps.

Figure 6:
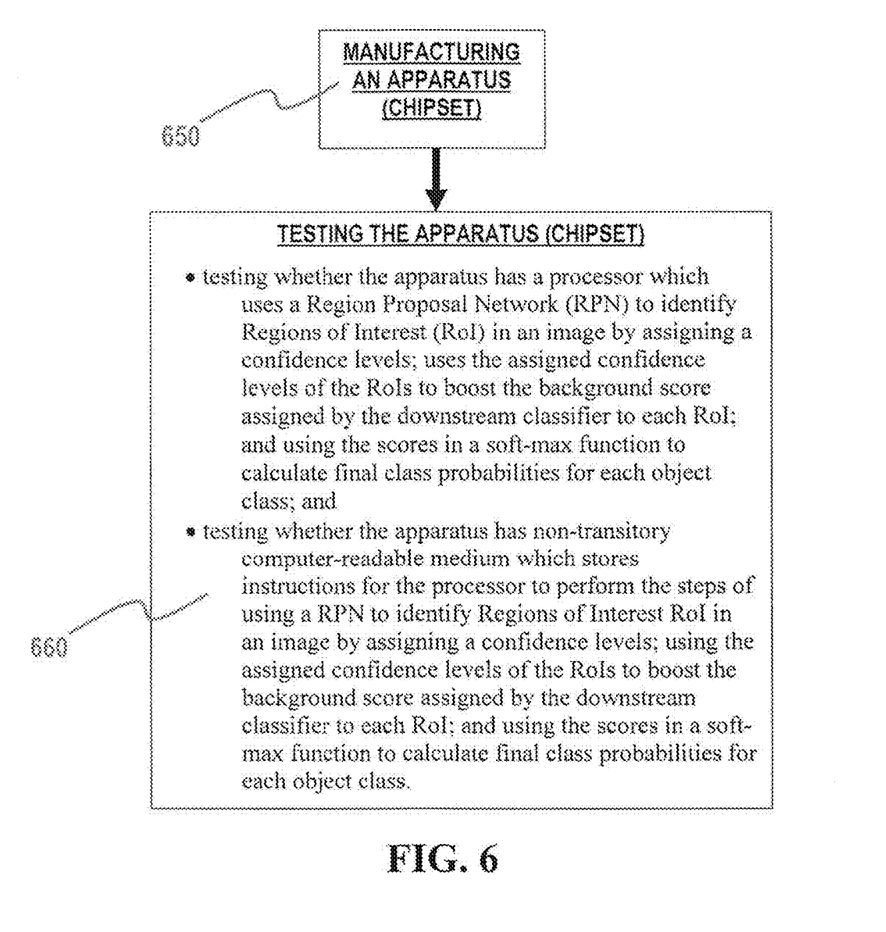
FIG. 6 illustrates an exemplary flowchart for manufacturing and testing the present apparatus, according to one embodiment.

FIG. 6 illustrates an exemplary flowchart for manufacturing and testing the present apparatus, according to one embodiment.

At 650, the apparatus (in this instance, a chipset) is manufactured, including at least one processor and one or more non-transitory computer-readable media. When executing instructions stored on the one or more non-transitory computer readable media, the at least one processor performs the steps of using an RPN to identify RoIs in an image by assigning a confidence levels; using the assigned confidence levels of the RoIs to boost the background score assigned by the downstream classifier to each RoI; and using the scores in a softmax function to calculate final class probabilities for each object class. The one or more non-transitory computer-readable media store instructions for the at least one processor to perform the above-listed steps.

At 660, the apparatus (in this instance, a chipset) is tested. Testing 660 includes testing whether the apparatus has at least one processor which, when executing instructions stored on one or more non-transitory computer readable media, performs the steps of using an RPN to identify RoIs in an image by assigning a confidence levels; using the assigned confidence levels of the RoIs to boost the background score assigned by the downstream classifier to each RoI; and using the scores in a softmax function to calculate final class probabilities for each object class; and testing whether the apparatus has the one or more non-transitory computer-readable media which store instructions for the at least one processor to perform the above-listed steps.

In another embodiment, a chipset is manufactured, including at least one processor and one or more non-transitory computer-readable media. The at least one processor, when executing instructions stored on the one or more non-transitory computer readable media, uses at least one of confidence levels assigned by an RPN to identify RoIs in an image, semantic segmentation masks, and the magnitude of optical flow to boost background scores used by the downstream classifier. Moreover, the one or more non-transitory computer-readable media stores instructions for the at least one processor to perform the above-listed steps.

In this embodiment, the chipset may be tested by testing whether the apparatus has at least one processor which, when executing instructions stored on one or more non-transitory computer readable media, uses at least one of confidence levels assigned by an RPN to identify RoIs in an image, semantic segmentation masks, and the magnitude of optical flow to boost background scores used by the downstream classifier; and testing whether the apparatus has the one or more non-transitory computer-readable media which store instructions for the at least one processor to perform that step.

In embodiments of the present disclosure, a fully deep convolutional neural network approach to pedestrian detection, based on the recently introduced R-FCN architecture, is provided. In one aspect of the present disclosure, the scores of RPN are used to improve the performance of the downstream classifier.

The steps and/or operations described above in relation to an embodiment of the present disclosure may occur in a different order, or in parallel, or concurrently for different epochs, etc., depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/ modules may be implemented or provided in a variety and/or combinations of manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

One or more processors, simple microcontrollers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software.

The term "computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium on which instructions which can be executed by a processor are stored.

Some embodiments of the present disclosure may be implemented, at least in part, on a portable device. "Portable device" and/or "mobile device" as used herein refers to any portable or movable electronic device having the capability of receiving wireless signals, including, but not limited to, multimedia players, communication devices, computing devices, navigating devices, etc. Thus, mobile devices include (but are not limited to) user equipment (UE), laptops, tablet computers, portable digital assistants (PDAs), mp3 players, handheld PCs, instant messaging devices (IMD), cellular telephones, global navigational satellite system (GNSS) receivers, watches, or any such device which can be worn and/or carried on one's person.

Various embodiments of the present disclosure may be implemented in an integrated circuit (IC), also called a microchip, silicon chip, computer chip, or just "a chip," as would be understood by one of ordinary skill in the art, in view of the present disclosure. Such an IC may be, for example, a broadband and/or baseband modem chip.

While several embodiments have been described, it will be understood that various modifications can be made without departing from the scope of the present disclosure. Thus, it will be apparent to those of ordinary skill in the art that the present disclosure is not limited to any of the embodiments described herein, but rather has a coverage defined only by the appended claims and their equivalents.

What is claimed is:

1. A method of object detection in an image using a region-based deep learning model, the method comprising:
    identifying, using a region proposal network (RPN), regions of interest (RoI) in the image and assigning a confidence levels to each identified RoI;
    boosting a background score assigned by a downstream classifier to each RoI, using the confidence level assigned to the ROI and optical flow magnitude;
    using the boosted background scores in a softmax function to calculate final class probabilities; and
    identifying each RoI as including an object in a foreground of the image or as a part of the background of the image, based on the final class probabilities.

2. The method of claim 1, wherein the object includes a pedestrian.

3. The method of claim 1, wherein the region-based deep learning model is a faster region-based convolutional neural network (R-CNN).

4. The method of claim 1, wherein the region-based deep learning model is a region-based fully convolutional network (R-FCN).

5. The method of claim 1, wherein the confidence levels comprise $P_B$, which is a probability of the RoI being the background, and $P_F$, which is a probability of the RoI including the object in the foreground.

6. The method of claim 5, wherein $s_0$ is the background score assigned by the downstream classifier to a RoI boosted according to the formula:

$$s_0 = \begin{cases} s_0 & \text{if } P_B < P_F \\ \dfrac{P_B \cdot s_0}{P_F} & \text{otherwise} \end{cases}.$$

7. The method of claim 1, wherein using the assigned confidence levels of the RoIs to boost the background score assigned by the downstream classifier to each RoI comprises:
    iteratively refining the boosted background scores.

8. The method of claim 1, wherein semantic segmentation masks are also used to boost the background score assigned by the downstream classifier to each RoI.

9. An apparatus capable of object detection using a region-based deep learning model, comprising:
one or more non-transitory computer-readable media; and
at least one processor which, when executing instructions stored on one or more non-transitory computer readable media, performs the steps of:
identifying, using a region proposal network (RPN), regions of interest (RoI) in the image and assigning a confidence levels to each identified RoI;
boosting a background score assigned by a downstream classifier to each RoI, using the confidence level assigned to the ROI and optical flow magnitude;
using the boosted background scores in a softmax function to calculate final class probabilities; and
identifying each RoI as including an object in a foreground of the image or as a part of the background of the image, based on the final class probabilities.

10. The apparatus of claim 9, where the object includes a pedestrian.

11. The apparatus of claim 9, wherein the region-based deep learning model is a faster region-based convolutional neural network (R-CNN).

12. The apparatus of claim 9, wherein the region-based deep learning model is a region-based fully convolutional network (R-FCN).

13. The apparatus of claim 9, wherein the confidence levels comprise $P_B$, which is a probability of the RoI being the background, and $P_F$, which is a probability of the RoI including the object in the foreground.

14. The apparatus of claim 13, wherein so is the background score assigned by the downstream classifier to a RoI boosted according to the formula:

$$s_0 = \begin{cases} s_0 & \text{if } P_B < P_F \\ \frac{P_B \cdot s_0}{P_F} & \text{otherwise} \end{cases}.$$

15. The apparatus of claim 9, wherein using the assigned confidence levels of the RoIs to boost the background score assigned by the downstream classifier to each RoI comprises:
iteratively refining the boosted background scores.

16. The apparatus of claim 9, wherein semantic segmentation masks are also used to boost the background score assigned by the downstream classifier to each RoI.

17. A method, comprising:
manufacturing a chipset comprising:
at least one processor which, when executing instructions stored on one or more non-transitory computer readable media, performs the steps of:
identifying, using a region proposal network (RPN), regions of interest (RoI) in the image and assigning a confidence levels to each identified RoI;
boosting a background score assigned by a downstream classifier to each RoI, using the confidence level assigned to the ROI and optical flow magnitude;
using the boosted background scores in a softmax function to calculate final class probabilities; and
identifying each RoI as including an object in a foreground of the image or as a part of the background of the image, based on the final class probabilities, and
the one or more non-transitory computer-readable media which store the instructions.

18. A method of testing an apparatus, comprising:
testing whether the apparatus has at least one processor which, when executing instructions stored on one or more non-transitory computer readable media, performs the steps of:
identifying, using a region proposal network (RPN), regions of interest (RoI) in the image and assigning a confidence levels to each identified RoI;
boosting a background score assigned by a downstream classifier to each RoI, using the confidence level assigned to the ROI and optical flow magnitude;
using the boosted background scores in a softmax function to calculate final class probabilities; and
identifying each RoI as including an object in a foreground of the image or as a part of the background of the image, based on the final class probabilities, and
testing whether the apparatus has the one or more non-transitory computer-readable media which store the instructions.

* * * * *